United States Patent
Krishnamurthy et al.

(10) Patent No.: US 7,933,745 B2
(45) Date of Patent: Apr. 26, 2011

(54) SYSTEM AND METHOD FOR PROFILING RESOURCE CONSTRAINTS OF WEB SERVERS

(75) Inventors: Balachander Krishnamurthy, New York, NY (US); Srinivasa Aditya Akella, Middleton, WI (US); Pratap Ramamurthy, Madison, WI (US); Vyas Sekar, Pittsburgh, PA (US); Anees Shaikh, Yorktown Heights, NY (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 479 days.

(21) Appl. No.: 12/082,022

(22) Filed: Apr. 8, 2008

(65) Prior Publication Data

US 2009/0094000 A1 Apr. 9, 2009

Related U.S. Application Data (60) Provisional application No. 60/998,201, filed on Oct. 9, 2007.

(51) Int. Cl.
*G06F 19/00* (2011.01)
(52) U.S. Cl. .................................................... 702/186
(58) Field of Classification Search .................. 702/117, 702/118, 182–185, 188
See application file for complete search history.

(56) References Cited

U.S. PATENT DOCUMENTS

| 6,973,490 B1 | 12/2005 | Robertson et al. |
| 2008/0225718 A1* | 9/2008 | Raja et al. ..................... 370/235 |

* cited by examiner

*Primary Examiner* — Edward Raymond (57) ABSTRACT

Disclosed is a method and system for determining one or more performance characteristics of a target server. A command is transmitted from a coordinator to a plurality of clients. The command instructs the plurality of clients to each transmit a request targeting a sub-system of said target server. A response time is then received from each client and a performance characteristic is determined from the received response times.

22 Claims, 5 Drawing Sheets

CLIENTS REGISTER — 305
1. Obtain list of active client machines 1...k
2. If k < 50 abort
3. Repeat next two steps for each stage

DELAY COMPUTATION — 310
For clients i=1...k, Compute T(coord,i)
For clients 1...k
  1. Instruct client i to request object from target
  2 Client i computes T(i, target) and base response time for the object and reports to server

MFC EPOCHS — 315
Let P(e) indicate number of clients in epoch e. If $e_1 > e_2$ then $P(e_1) > P(e_2)$ For epochs 1...$k_{max}$
  1. Schedule a crowd of size P(e) (P(e) clients randomly selected from k) based on T(coord, i) and T(i, target) measurements
  2. Wait 10s after all clients are scheduled, then poll each client for experiment data — (client ID, HTTP code, numbytes, response time)
  3. Compute median increase in response time for all clients
  4. If median increase in response time exceeds 100ms
    If P(e) < 15, Move to next epoch
    Else
      a. Schedule three crowds of sizes P(e) −1, P(e) and P(e) + 1
      b. If median response time in one of three cases P(e), P(e-1) and P(e+1) exceeds 100ms
        Return crowdsize P(e)
        Terminate MFC stage
      c. Else
        Move to next epoch

FIG. 4

CLIENT REGISTER
1. Register with coordinator by sending a message including client ID to a fixed port on coordinator.
2. Listen for coordinator commands on port P
— 405

DELAY COMPUTATION
1. Respond to Ping from coordinator
2. Request object from target
3. Compute T(i, target) and base response time for the object
4. Report the two to the coordinator
— 410

MFC EPOCHS
Upon receiving a command from the coordinator
1. Request object from target
2. If full response not received by 10s
    Kill the request, and set code=ERR, and response time=10s
3. Else
    Record (numbytes, HTTP status code, response time)
4. In response to coordinator's poll for data send (clientID, HTTP code, numbytes, response time)
— 415

FIG. 5

SYSTEM AND METHOD FOR PROFILING RESOURCE CONSTRAINTS OF WEB SERVERS

This application claims the benefit of U.S. Provisional Application No. 60/998,201 filed Oct. 9, 2007 which is incorporated herein by reference.

BACKGROUND OF THE INVENTION

The present invention is generally directed to web servers, and more particularly to determining resource constraints of web servers.

As web-based applications on the Internet grow in popularity, their providers often face the challenge of determining how to provision server-side resources so that the web-based application's response time, or time it takes for an application to respond to a user request, is satisfactory. Ideally, these resources, such as processing and memory capacity, database and storage, and access bandwidth, should be provisioned to deliver satisfactory performance under a broad range of operating conditions. Since a server provider cannot predict the volume and mix of requests that a server is going to receive, the provisioning of server resources is difficult.

The amount of resources provisioned by server providers is often a function of the size of the server provider. Large server providers typically resort to over-provisioning, or employ techniques such as distributed content delivery or dynamic server provisioning, to minimize the impact of unexpected surges in request traffic. Smaller application providers may trade robustness to large variations in workload for a less expensive infrastructure that is provisioned for the expected common load.

Provisioning resources based on the size of the service provider does not facilitate determining how an application infrastructure will handle large increases in traffic. Large increases in traffic may be due to planned events such as annual sales or Web casts, or unexpected surges in traffic due to attacks or "flash crowds" (i.e., a large number of people traversing a single web page over a short period of time). While these events may not occur frequently, the inability of the infrastructure to maintain reasonably good service, or at least degrade gracefully, can lead to significant loss of revenue and highly dissatisfied users. Without comprehensive stress testing that would likely disrupt service, there is currently no way for providers to observe the performance of their sites under heavy load in a controlled way.

Traditional benchmarking approaches or load generation tools used to test web servers in controlled local area network (LAN) settings cannot reveal effects of wide-area conditions or characteristics of the actual Internet connectivity of the clients (e.g., speed, location, diversity, etc.). More importantly, such laboratory-based experiments cannot help administrators assess the impact of access bandwidth—e.g., how the bandwidth limits the performance of clients under overload, and how bandwidth-imposed constraints compare against constraints on other server-side resources. While laboratory load testing is useful, it is difficult to recreate all of the dependencies of an Internet-facing live deployment in a laboratory setting.

Therefore, there remains a need to analyze a web server's resource provisioning in order to determine whether the web server can handle unexpected increases in traffic.

BRIEF SUMMARY OF THE INVENTION

In accordance with an embodiment of the present invention, one or more performance characteristics of a target server is determined. A command is transmitted from a coordinator to a plurality of clients. The command instructs the plurality of clients to each transmit a request to the target server targeting a sub-system of the target server. The requests are received by the target server within a predetermined time period (e.g., synchronously). A response time is then received from each client and a performance characteristic of the targeted sub-system is determined from the received response times. Performance characteristics of the target server can include network access bandwidth, data processing capabilities, and HTTP request processing time.

The coordinator can isolate and exercise a target server's various sub-systems in a variety of manners. In one embodiment, the coordinator determines objects stored on the target server and classifies each object as a large object or a small query. The coordinator then executes a large object stage, a small query stage, and/or a base stage.

During the large object stage, the coordinator instructs the clients to request the same large object within a predetermined time period (e.g., simultaneously). As a result, the coordinator is likely exercising the target server's network access bandwidth during the large object stage. In one embodiment, a fairly large lower bound (e.g., 100 KB) on the size of the large object is used to allow TCP to exit slow start (i.e., to exit the algorithm used to avoid sending more data than the network is capable of transmitting) and fully utilize the available network bandwidth. Because the same object is requested, the likely caching of the object reduces the chance that the server's storage sub-system is exercised.

During the small query stage, the coordinator instructs the clients to request a unique dynamically generated object if available. If such an object is not available, then the coordinator instructs the clients to request the same dynamic object. Because such queries often require some interaction with, and some computation over, a back-end database, the coordinator is likely exercising the target server's back-end data processing sub-system and possibly the server CPU. In one embodiment, a small upper bound (e.g., 15 KB) on the response size is used so that the network bandwidth remains under-utilized. This enables the isolation of the access bandwidth from the effect of the rest of the server infrastructure.

In the base stage, the coordinator instructs the clients to make a HEAD request for the base page hosted by the target server. This likely provides an estimate of basic HTTP request processing time at the target server.

These and other advantages of the invention will be apparent to those of ordinary skill in the art by reference to the following detailed description and the accompanying drawings.

DETAILED DESCRIPTION

In accordance with an embodiment of the present invention, a determination of performance characteristics of a web server is determined. The performance characteristics of the web server can be determined by quantifying the number and type of simultaneous requests that exercise at least one sub-system of the server and that affect response time of the server. For example, a web server provider can compare the impact of an increase in database-intensive requests (one server sub-system) with the impact of an increase in bandwidth-intensive requests (another server sub-system). The server provider can use this information to make better decisions about how to prioritize additional provisioning, or take other actions (e.g., introduce request shaping).

Figure 1:
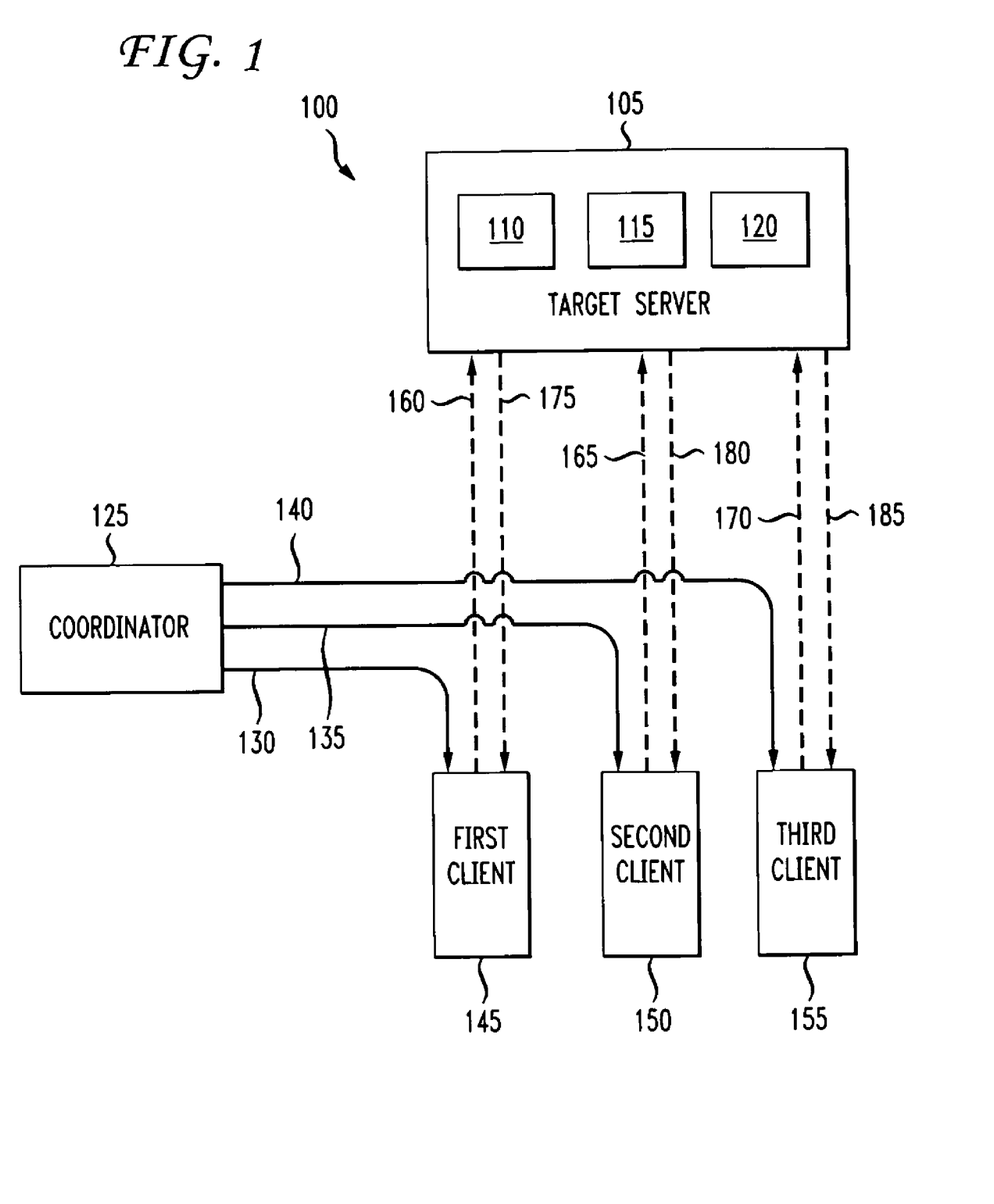
FIG. 1 is a block diagram of a system having a coordinator in communication with a plurality of clients and used to determine one or more performance characteristics of a target web server in accordance with an embodiment of the present invention.

FIG. 1 is a block diagram of a system 100 to determine one or more performance characteristics of target server 105. The target server 105 includes a plurality of sub-systems, such as a first sub-system 110, a second sub-system 115, and a third sub-system 120. Examples of a sub-system 110, 115, 120 include a network access sub-system, a storage sub-system, and a back-end data processing sub-system. The sub-systems can include hardware, software, and/or firmware.

A coordinator computer (referred to below as coordinator) 125 coordinates a "mini-flash crowd" (MFC) on the target server 105 in order to determine one or more performance characteristics of the target server 105. In particular, the coordinator 125 transmits a command (e.g., commands 130, 135, 140) to a plurality of clients (e.g., first client 145, second client 150, and third client 155). Each command 130, 135, 140 includes instructions that instruct its corresponding client 145, 150, 155 to transmit a request 160, 165, 170 to the target server 105 at a request transmit time (which may be different for each client) so that the target server 105 receives each request approximately synchronously (i.e., within a predetermined time period). Requests 160, 165, 170 that are received by the target server 105 within a predetermined time period are referred to below as synchronized requests.

The synchronized requests are scheduled in a coordinated manner by the coordinator 125. The coordinator 125 specifically determines and uses measurements of network delay between each client 145, 150, 155 and the target server 105. Each request 160, 165, 170 targets the same sub-system, such as sub-system 110, of the target server 105.

In one embodiment, the coordinator 125 gradually increases the number of clients 145, 150, 155 that transmit a request 160, 165, 170 to the target server 105. As the number of clients 145, 150, 155 transmitting synchronized requests 160, 165, 170 increases, one or more of the server's sub-systems 110, 115, 120 may become stressed, leading to a small, but discernible and persistent, rise in a response time 175, 180, 185 to the request 160, 165, 170. Based on this response time change, inferences can be made about the relative provisioning of the resources of the targeted sub-system 110, 115, 120. In one embodiment, the number of clients 145, 150, 155 making synchronized requests 160, 165, 170 are increased only up to a set maximum. If the number of clients 145, 150, 155 making synchronized requests 160, 165, 170 are set to this maximum and no change in the response time is observed, the target server 105 can be labeled as unconstrained. This "conservative" approach (i.e., only increasing the number of clients transmitting synchronized requests to the target server to a set maximum) allows the system 100 to reveal resource constraints of the target server 105 while limiting its intrusiveness on the target server 105.

The clients 145, 150, 155 each receive and log a respective response time 175, 180, 185 associated with their respective requests 160, 165, 170 and send this information to the coordinator 125. The coordinator 125 may use the information sent from the clients 145, 150, 155 to determine, for example, the number of clients that are going to send a request to the target server 105 during a next time period, how to determine resource constraints associated with the target server 105, and how to stop the coordinator's execution of steps (as described in more detail below).

Figure 2:
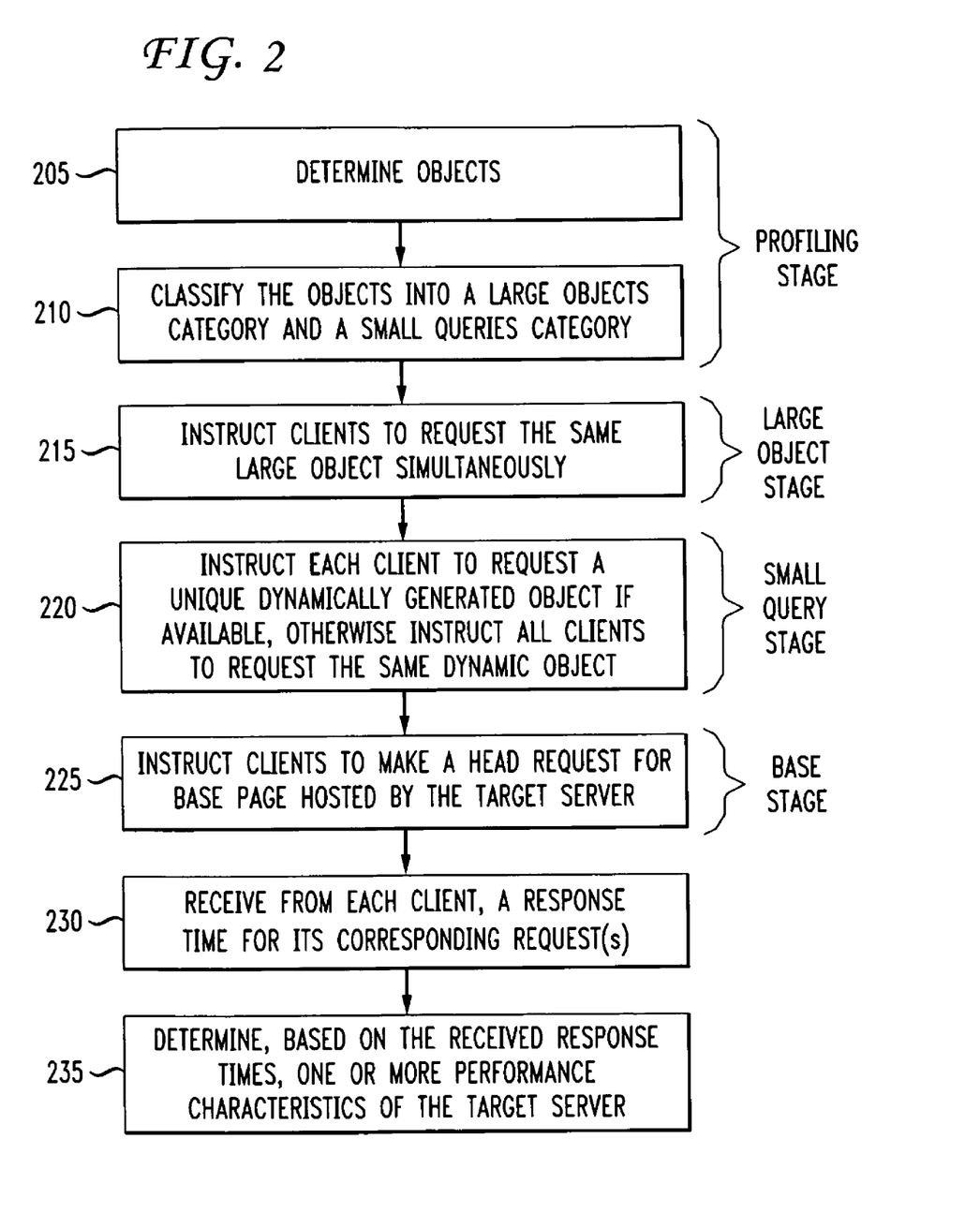
FIG. 2 shows a flowchart illustrating the steps performed by the coordinator to determine one or more performance characteristics of the target server in accordance with an embodiment of the present invention.

FIG. 2 shows a flowchart illustrating an embodiment of the steps performed by the coordinator 125 to determine one or more performance characteristics of the target server 105. The coordinator 125 initially performs a profiling stage before any requests are transmitted to the target server 105.

In the profiling stage, the coordinator 125 examines the target server 105 to determine, in step 205, objects associated with the target server 105 (e.g., stored on the target server 105). In one embodiment, the coordinator 125 analyzes the target server's content and automatically classifies the content into different content categories. This classification may be based on, for example, heuristics such as file name extensions and file sizes. Specifically, the coordinator 125 classifies the objects into a number of classes based on content type, such as regular/text files (e.g., txt and/or HTML files, binaries (e.g., .pdf, .exe, and/or .tar.gz files), images (e.g., .gif, .jpg files), and queries.

In another embodiment, the object associated with the target server 105 is a secure object that requires a password to gain access. In yet another embodiment, the object associated with the target server 105 is an object that is not stored on the server but causes the request to be redirected to a remote server or a Content Distribution Network server.

Additionally, in step 210, the coordinator 125 classifies the objects into two categories based on the identified object sizes (obtained by issuing a HEAD request for files and a GET request for queries): Large Objects and Small Queries. As described in more detail below, these categories are selected for their expected impact on specific server resources or sub-systems 110, 115, 120.

The Large Objects group contains regular files, binaries, and images having a size greater than a predetermined large object size (e.g., greater than 100 KB in size). The Small Queries group is determined by identifying Uniform Resource Locators (URLs) that appear to generate dynamic responses (queries) and select queries that generate a response under a predetermined small query size (e.g., 15 KB). In one embodiment, a small query is not a web form but is a URL with a "?" indicating a CGI script. For example, a URL of the form http://www.ask.com/web?q=foo is a URL with a "?" in it and likely to trigger an action on the remote web server (www.ask.com).

After the profiling stage is completed, the coordinator 125 executes a Large Object stage, a Small Query stage, and/or a Base Stage. In each stage, a varying number of synchronized requests for objects from a specific request category are transmitted to the target server 105.

In the Large Object stage (step 215), the coordinator 125 instructs clients to request the same large object simultaneously. This primarily exercises the server's network access bandwidth. A fairly large lower bound (e.g., 100 KB) on the size of the Large Object is used to allow TCP to exit slow start (as described above) and fully utilize the available network bandwidth. Examples of large objects include binary executables and movie files. Since the same large object is requested by all of the clients, the likely caching of the object reduces the chance that the server's storage sub-system is exercised.

In the Small Query stage, the coordinator 125 instructs, in step 220, each client to request a unique dynamically generated object, if available. A unique dynamically generated object is a resource that did not statically exist but was generated at the time of a query and thus can be different each time. For example, when someone visits http://www.ask.com/web?cgi-bin/foo or when someone searches for a string on an Internet search engine, the results generated from the cgi execution or the search query is a dynamic object. Thus, an example of a unique dynamically generated object is one that is not likely to have been generated earlier (based on a prior query) and so for example if someone were to use the search term that is a concatenation of a random set of characters generated using a random generator it would be safe to assume that it is unique.

Otherwise, all clients request the same dynamic object in step 220. Since such queries often require some interaction with, and some computation over, a back-end database, this stage likely affects the back-end data processing sub-system and possibly the server CPU, whether the clients request the same or different small queries. The load on the database back-end is likely to be lower when clients request different small queries due to caching of results in the database front-end. In one embodiment, a small upper bound (15 KB) constrains the size of the response from the server 105 so that the network bandwidth remains under-utilized. This enables isolation of access bandwidth from the effect of the rest of the target server infrastructure.

In the Base stage (step 225), the coordinator 125 instructs its clients to make a HEAD request for a base page hosted on the target server 105 (e.g., index.html or index.php). This provides an estimate of basic HTTP request processing time at the server 105.

The coordinator 125 receives, from each client in the group of clients, a response time 175, 180, 185 associated with the client's request 160, 165, 170 in step 230. In one embodiment, the coordinator 125 receives all of the response times at once from the clients. Alternatively, the coordinator 125 receives a response time from each client at a different time. The coordinator 125 then determines, based on the received response times, one or more performance characteristic of the target server 105 in step 235.

Although FIG. 2 shows the Large Object stage occurring before the Small Query stage and the Small Query stage occurring before the Base Stage, it should be noted that these stages may occur in any order and further that one or more of the stages may not occur at all (e.g., if there are no small queries found on the target server 105, then the Small Query stage (i.e., step 220) is not performed). Additionally, other stages may also be performed based on the determined object.

Each stage after the profiling stage consists of several epochs. In epoch k, the coordinator 125 directs $N_k$ participating clients to issue concurrent requests of a given category to the target server 105. Clients participating in epoch k constitute a crowd. The coordinator 125 determines the particular object $O_{i,k}$ that client i should request in an epoch k. The coordinator 125 executes each stage (after the profiling stage) for a preset maximum number of epochs $k_{max}$.

Before Epoch 1, each participating client i measures the base response time for downloading the objects $O_{i,1} \ldots O_{i,kmax}$ from the target server 105. In one embodiment, clients make these measurements sequentially so that they do not impact each other's base response time estimates.

In one embodiment, at the end of each epoch, each client reports the normalized response time to the coordinator 125. The normalized response time is the difference between the observed response time for the request and the base response time for the same request. Successive epochs are separated by a predetermined amount of time, such as approximately 10 seconds. Based on the clients' response times for requests in epochs 1 . . . i, the coordinator 125 either terminates the step that the coordinator 125 is executing, or moves to epoch i+1. The coordinator 125 may use the following algorithm to decide the next step:

1. Check. For the Base stage and the Small Query stage, if the median normalized response time reported by the clients in epoch i is greater than a threshold θ, the coordinator 125 enters a "check" phase. The median may be used to counter the impact of noise on the response time measurements. If the median normalized response time is X ms, this implies that at least 50% of the clients observed an X ms increase in their response time for the request, which in turn indicates that the target server 105 may be experiencing high load.

The goal of the "check" phase is to ascertain that the observed degradation in response time is in fact due to overload on a particular server sub-system 110, 115, 120, and not due to stochastic effects. To verify this, the coordinator 125 can create three additional epochs, one numbered "i-" with $N_i-1$ clients, a second numbered "i+" with $N_i+1$ clients, and a third epoch which is a repeat with $N_i$ clients. As soon as the median normalized response time in one of these additional epochs exceeds θ, the coordinator 125 terminates execution of its current step, concluding that a limitation has been found within the targeted sub-system. If there is no visible degradation in any of the additional epochs, the check fails and the coordinator 125 continues with epoch i+1.

Shared bottlenecks vs. Load on the access sub-system. As described above, the Large Object stage is designed to exercise the target server's network access bandwidth. However, depending on where the clients are located relative to the target server 105, the paths between the target server 105 and many of the clients may have bottleneck links which lie several network hops away from the target server 105. In such cases, the median increase in response time may reflect an increase in the load on the shared network bottlenecks, and not necessarily on the server's outbound access link. To counter this, in one embodiment a larger fraction of the clients (specifically, 90% of them) are required to observe >θ increase in the response time in the Large Object stage.

In general, for any of the stages described above, sub-system resource provisioning may be inferred more accurately by relying on the 90th percentile as described above. However, it has a downside relative to using the median: the server's resources may have to be loaded a bit longer before drawing an inference. As a trade-off between the requirement to be unobtrusive and the goal to accurately infer the constraints, in one embodiment the 90th percentile is used only for the Large Object stage, and the median is used for the other stages.

2. Progress. If there is no perceptible increase in the target server's response time, or the check phase fails, the coordinator 125 progresses to the next epoch where a larger number of clients participate. To ensure that the target server 105 does not face sudden load surges, the coordinator 125 increases the size of the crowd by a small value (e.g., 5 or 10 clients).

3. Terminate. If the check phase succeeds, or the number of participating clients exceeds a threshold, the coordinator 125 terminates the algorithm. If the number of participating clients exceeds a threshold, the coordinator 125 concludes that no limitations could be inferred for the particular resource or sub-system.

In a given epoch, the load on the target server 105 is proportional to the number of concurrent requests it is serving, which directly determines the server's response time. One requirement may be that when k clients participate in an epoch, the number of concurrent client requests at the server is ≈k. Implementing a distributed synchronization protocol among the clients may guarantee this property, but this may introduce a lot of complexity. Instead, in one embodiment the centralized coordinator 125 is leveraged to schedule client requests in a synchronous way.

To ensure synchronization, the coordinator 125 issues a command to the clients to measure the round-trip latency to the target server. In one embodiment, TCP pings are used (i.e., the delay between the transmission of a SYN packet and the reception of a SYN+ACK is measured). Client i then reports the round-trip delay $T_i^{target}$ to the coordinator 125. The coordinator 125 also measures its round-trip delay to each client $T_i^{coord}$. Using these measurements, the coordinator 125 schedules client requests so that they arrive at the target server 105 at roughly the same time T. Note that the actual HTTP request arrives at the target server 105 roughly at the same time as the completion of the 3-way SYN hand-shake. To synchronize client request arrivals, the coordinator 125 issues a command to client i at time $T-0.5*T_i^{coord}-1.5*T_i^{target}$. Assuming that the latency between the coordinator 125 and the clients has not changed since the initial latency estimate, client i will receive this command at time $T-1.5*T_i^{target}$; at this time, client i issues the request specified in the command by initiating a TCP hand-shake with the target server 125. Again, assuming client-target latency does not change, the first byte of client i's HTTP request will arrive at the target server 105 at time T. Since the transmitting of requests to the target server 105 by the clients typically spans only a few minutes, assuming that network latencies are stationary over this time-span is reasonable.

Figure 3:
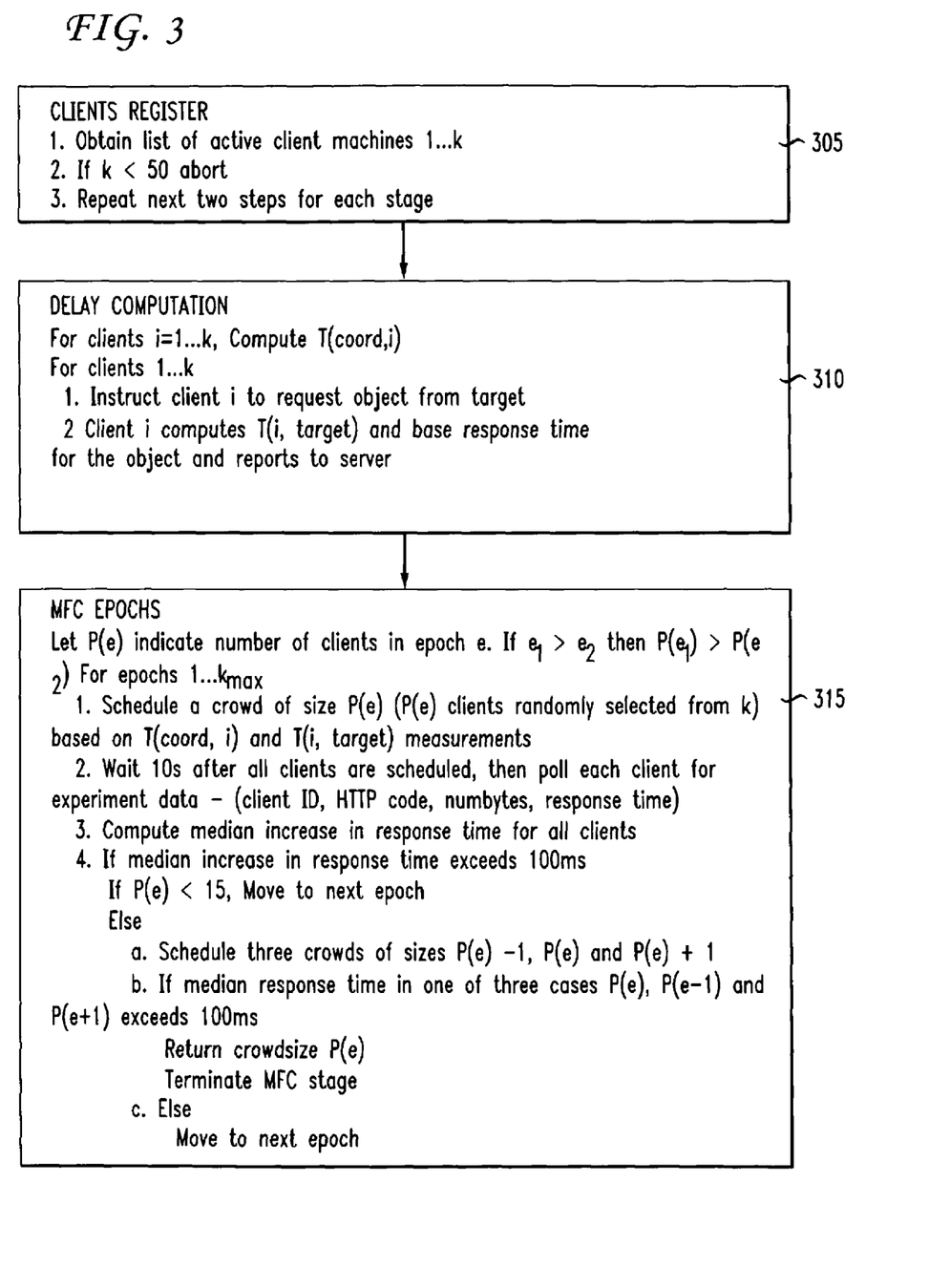
FIG. 3 shows pseudo-code of the steps performed by the coordinator in accordance with an embodiment of the present invention.

FIG. 3 is pseudo-code of an embodiment of the steps performed by the coordinator 125. FIG. 3 includes three pseudo-code sections—a clients register section 305, a delay computation section 310, and a MFC epochs section 315. The clients register section 305 illustrates steps executed by the coordinator 125 to determine clients that the coordinator 125 is going to instruct transmit requests to the server 105. In the delay computation section 310, the coordinator 125 instructs each client to transmit a request to the server 105 for an object on the server 105. As described above, each client transmits a normalized response time (i.e., the difference between the observed response time and a base response time for each request) to the coordinator 125.

In the MFC epochs section 315, the coordinator 125 executes several steps during each epoch. The coordinator 125 schedules a crowd of clients to transmit requests to the server 105. After the scheduling, the coordinator 125 waits a predetermined amount of time (e.g., 10 seconds). The coordinator 125 polls each client for its data, such as each client's response time. The coordinator 125 then computes a median increase in response time for the clients and may terminate the MFC epochs section 315 if the median response time exceeds, e.g., 100 ms or may move to the next epoch if the median response time does not exceed, e.g., 100 ms.

Thus, before executing the steps shown in FIG. 2, the coordinator 125 checks if at least a predetermined number of (e.g., 50) distinct clients are available to transmit requests to the target server 105 (as shown in section 305 of FIG. 3). The coordinator 125 may do this by verifying if at least 50 clients respond sufficiently quickly (within 1 s) to a probe message. If not, the coordinator 125 aborts the execution of the steps described above (as shown in FIG. 2). This check is important because, with a small number of participating clients, the coordinator 125 does not (likely) capture realistic wide-area conditions faced by generic Web clients accessing the target server 105. In one embodiment, the geographic locations of the clients are also considered, i.e., to ensure that the active clients are well spread out.

Note that in order for the median and the 90th percentile response time measurements in an epoch to be statistically significant and robust to noise, a sufficient number of clients are needed to be participating in the epoch. In one embodiment, this number is chosen to be 15 clients. Thus, for all initial epochs where fewer than 15 clients participate in the measurement, the coordinator 125 automatically progresses to the next epoch irrespective of the degradation in the response time observed in the current epoch.

Note also that, in one embodiment, the participating clients within each epoch are chosen at random (section 315). This is done to ensure that an observed increase in the median response time is purely due to an increase in the number of participating clients at the target server 105, and not due to the local conditions experienced by the clients themselves (e.g., transient congestion or noisy measurements due to load on a client).

It should be noted that the clients register section 305 and the delay computation section 310 are performed once. The MFC epochs section 315 is performed as many times as needed until latency exceeds the threshold or until there are no more clients.

Figure 4:
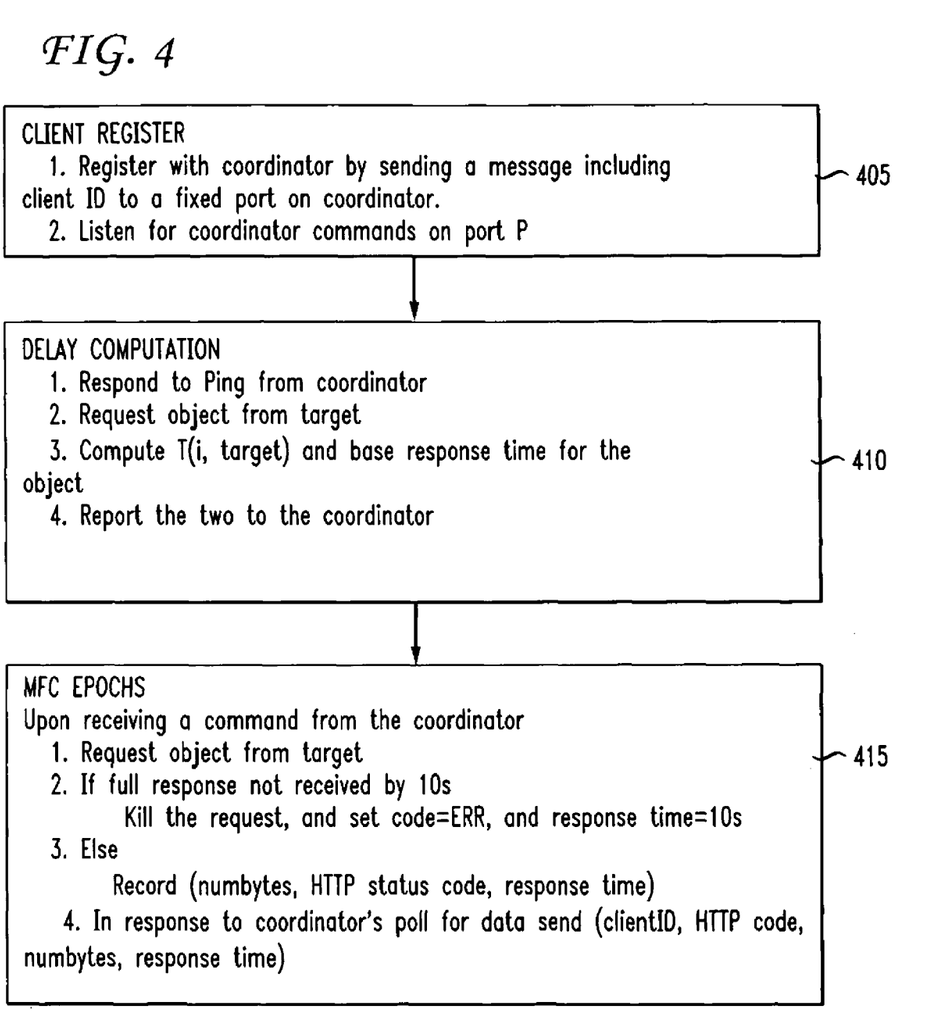
FIG. 4 shows pseudo-code of the steps performed by each of the clients in accordance with an embodiment of the present invention.

FIG. 4 is pseudo-code of the steps performed by each client 145, 150, 155. FIG. 4 also includes three pseudo-code sections—a clients register section 405, a delay computation section 410, and a MFC epochs section 415. In the clients register section 405, each client registers with the coordinator and then "listens" for commands from the coordinator. In the delay computation section 410, each client requests an object from the target server 105 and determines an observed response time and a base response time. In one embodiment, the client reports both the observed response time and the base response time to the coordinator. Alternatively, the client reports the normalized response time, as described above, to the coordinator 125.

The MFC epochs section 415 describes the steps performed by each client during each epoch. Upon receiving a command from the coordinator 125, the client requests an object from the target server 105 (e.g., via an HTTP request). If a response is not received within a given time period (e.g., 10 seconds), the request is aborted and a response time associated with the specific request is set to the given time period (e.g., 10 seconds). Otherwise, the client records the response time. Since the timeliness of the communication between the coordinator 125 and clients is important for synchronization, in one embodiment UDP is used for all control messages. Further, a retransmit mechanism may not be implemented for lost messages.

In one embodiment, all of the client requests are directed to a single target server IP address. If a server's domain name system (DNS) name maps to multiple IP addresses, one IP address is selected at random and all of the client requests are sent to this single IP address.

In one embodiment, instrumentation and resource usage-tracking (e.g., using utilities such as atop or sysstat), when performed in coordination with the execution of the steps described above (e.g., in FIG. 2) can offer deeper insights into the target servers provisioning. Coordinated observations can also uncover implementation bugs that result in bottlenecks.

Figure 5:
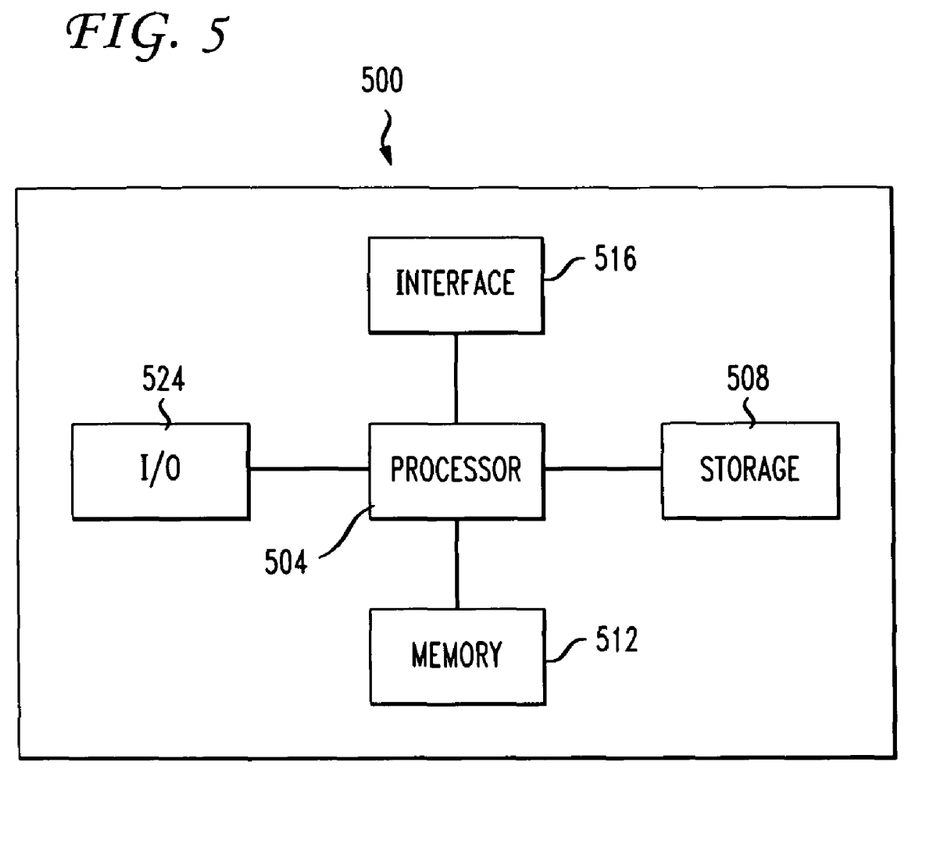
FIG. 5 is a high level block diagram of a computer in accordance with an embodiment of the present invention.

FIG. 5 shows a high level block diagram of a computer 500 which may be used to implement the response email generation module. The computer 500 can, for example, perform the steps described above (e.g., with respect to FIGS. 2, 3, and 4). Computer 500 contains a processor 504 which controls the overall operation of the computer by executing computer program instructions which define such operation. The computer program instructions may be stored in a storage device 508 (e.g., magnetic disk, database) and loaded into memory 512 when execution of the computer program instructions is desired. Thus, the computer operation will be defined by computer program instructions stored in memory 512 and/or storage 508 and the computer will be controlled by processor 504 executing the computer program instructions. Computer 500 also includes one or more interfaces 516 for communicating with other devices. Computer 500 also includes input/output 524 which represents devices which allow for user interaction with the computer 500 (e.g., display, keyboard, mouse, speakers, buttons, etc.). One skilled in the art will recognize that an implementation of an actual computer will contain other components as well, and that FIG. 5 is a high level representation of some of the components of such a computer for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method for determining a performance characteristic of a target server having a plurality of sub-systems, the method comprising:
   transmitting a command to a plurality of clients, the command instructing each of the plurality of clients to transmit to the target server a request targeting a sub-system of the target server;
   receiving, from each client of the plurality of clients, a response time for its request; and
   determining a performance characteristic of the target server based on the received response times, wherein the transmitting the command to each of the plurality of clients further comprises transmitting the command to each of the plurality of clients with instructions to instruct the client to transmit its request at a corresponding request transmit time.

2. The method of claim 1 wherein the performance characteristic comprises one of network access bandwidth of the target server, data processing capabilities of the target server, and HTTP request processing time at the target server.

3. The method of claim 1 further comprising determining objects associated with the target server.

4. The method of claim 3 further comprising classifying each of the objects as one of a large object and a small query.

5. The method of claim 4 further comprising executing one of a large object stage, a small query stage, and a base stage.

6. The method of claim 5 further comprising transmitting a command to instruct each of the plurality of clients to transmit a request for a first object during a first period of time, the first period of time occurring during execution of one of the large object stage and the small query stage.

7. The method of claim 6 wherein the first object is a dynamic object.

8. The method of claim 5 wherein the transmitting a command further comprises transmitting a command to instruct each of the plurality of clients to transmit a request for a dynamically generated object when executing the small query stage.

9. The method of claim 5 further comprising transmitting a HEAD request for a base page hosted on the target server when executing the base stage.

10. An apparatus for determining a performance characteristic of a target server having a plurality of sub-systems, the apparatus comprising:
    means for transmitting a command to a plurality of clients, the command instructing each of the plurality of clients to transmit to the target server a request targeting a sub-system of the target server;
    means for receiving, from each client of the plurality of clients, a response time for its request; and
    means for determining a performance characteristic of the target server based on the received response times, wherein the means for transmitting a command to each of the plurality of clients further comprises means for transmitting a command to each of the plurality of clients with instructions to instruct the client to transmit a request at a corresponding request transmit time.

11. The apparatus of claim 10 wherein the performance characteristic comprises one of network access bandwidth of the target server, data processing capabilities of the target server, and HTTP request processing time at the target server.

12. The apparatus of claim 10 further comprising means for determining objects associated with the target server.

13. The apparatus of claim 12 further comprising means for classifying each of the objects as one of a large object and a small query.

14. The apparatus of claim 13 further comprising means for executing one of a large object stage, a small query stage, and a base stage.

15. The apparatus of claim 14 further comprising means for transmitting a command to instruct each of the plurality of clients to transmit a request for a first object during a first period of time, the first period of time occurring during execution of one of the large object stage and the small query stage.

16. The apparatus of claim 15 wherein the first object is a dynamic object.

17. The apparatus of claim 14 wherein the means for transmitting a command further comprises means for transmitting a command to instruct each of the plurality of clients to transmit a request for a dynamically generated object when executing the small query stage.

18. The apparatus of claim 14 further comprising means for transmitting a HEAD request for a base page hosted on the target server when executing the base stage.

19. A non-transitory computer readable medium storing instructions thereon that when executed by a computing device cause the computing device to perform the operations of:
    transmitting a command to a plurality of clients, the command instructing each of the plurality of clients to transmit to the target server a request targeting a sub-system of a target server;

receiving, from each client of the plurality of clients, a response time for its request; and determining a performance characteristic of the target server based on the received response times, wherein the transmitting further comprises transmitting the command to each of the plurality of clients with instructions to instruct the client to transmit its request at a corresponding request transmit time.

20. The non-transitory computer readable medium of claim 19 wherein the operations further comprise determining objects associated with the target server.

21. The non-transitory computer readable medium of claim 20 wherein the operations further comprise classifying each of the objects as one of a large object and a small query.

22. The non-transitory computer readable medium of claim 21 wherein the operations further comprise executing one of a large object stage, a small query stage, and a base stage.

* * * * *